United States Patent
Bangalore et al.

(10) Patent No.: US 10,796,100 B2
(45) Date of Patent: **\*Oct. 6, 2020**

(54) UNDERSPECIFICATION OF INTENTS IN A NATURAL LANGUAGE PROCESSING SYSTEM

(71) Applicant: Interactions LLC, Franklin, MA (US)

(72) Inventors: Srinivas Bangalore, Morristown, NJ (US); John Chen, Millburn, NJ (US)

(73) Assignee: Interactions LLC, Franklin, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,433

(22) Filed: Jan. 15, 2019

(65) Prior Publication Data

US 2019/0147044 A1 May 16, 2019

Related U.S. Application Data

(63) Continuation of application No. 15/384,275, filed on Dec. 19, 2016, now Pat. No. 10,216,832.

(51) Int. Cl.
*G06F 17/28* (2006.01)
*G06F 40/30* (2020.01)
(Continued)

(52) U.S. Cl.
CPC .......... *G06F 40/30* (2020.01); *G06F 16/3329* (2019.01); *G06F 40/137* (2020.01); *G10L 15/183* (2013.01); *G10L 15/1815* (2013.01)

(58) Field of Classification Search
CPC ..... G10L 15/1815; G10L 15/22; G10L 15/26; G10L 15/1822; G10L 15/063;
(Continued)

(56) References Cited

U.S. PATENT DOCUMENTS

| 5,418,717 A | 5/1995 | Su et al. |
| 5,434,777 A | 7/1995 | Luciw |

(Continued)

FOREIGN PATENT DOCUMENTS

| KR | 10-2011-0072847 A | 6/2011 |
| WO | WO2015/151157 A1 | 10/2015 |

OTHER PUBLICATIONS

PCT International Search Report and Written Opinion, PCT Application No. PCT/US2017/057867, dated Jan. 30, 2018, 9 pages.

(Continued)

*Primary Examiner* — Vijay B Chawan
(74) *Attorney, Agent, or Firm* — Fenwick & West LLP

(57) ABSTRACT

A natural language processing system has a hierarchy of user intents related to a domain of interest, the hierarchy having specific intents corresponding to leaf nodes of the hierarchy, and more general intents corresponding to ancestor nodes of the leaf nodes. The system also has a trained understanding model that can classify natural language utterances according to user intent. When the understanding model cannot determine with sufficient confidence that a natural language utterance corresponds to one of the specific intents, the natural language processing system traverses the hierarchy of intents to find a more general user intent that is related to the most applicable specific intent of the utterance and for which there is sufficient confidence. The general intent can then be used to prompt the user with questions applicable to the general intent to obtain the missing information needed for a specific intent.

18 Claims, 5 Drawing Sheets

(51) Int. Cl.
*G06F 40/137* (2020.01)
*G06F 16/332* (2019.01)
*G10L 15/18* (2013.01)
*G10L 15/183* (2013.01)

(58) Field of Classification Search
CPC ......... G10L 15/18; G10L 15/08; G10L 15/01; G10L 13/08; G10L 15/183; G10L 15/19; G10L 15/28; G10L 15/30; G10L 25/30; G06F 40/30; G06F 40/35; G06F 40/137; G06F 40/205; G06F 40/295; G06F 15/3329; G06F 16/35; G06F 3/167; G06F 9/54; G06N 20/00; G06N 5/04; G06N 3/006; G06N 3/08
USPC .............. 704/9, 10, 257, 251, 244, 245, 243
See application file for complete search history.

(56) References Cited

U.S. PATENT DOCUMENTS

| | | | |
|---|---|---|---|
| 5,625,814 A | 4/1997 | Luciw | |
| 5,748,841 A | 5/1998 | Morin et al. | |
| 7,634,406 B2 | 12/2009 | Li et al. | |
| 8,315,849 B1 | 11/2012 | Gattani et al. | |
| 8,321,220 B1* | 11/2012 | Chotimongkol | G09B 19/04 704/10 |
| 8,700,398 B2* | 4/2014 | Marcus | G10L 15/22 704/233 |
| 9,009,046 B1* | 4/2015 | Stewart | G06F 40/30 704/251 |
| 9,406,292 B2* | 8/2016 | Tur | G10L 15/1822 |
| 9,454,960 B2* | 9/2016 | Stewart | G10L 15/08 |
| 9,466,297 B2 | 10/2016 | Crook et al. | |
| 9,633,004 B2 | 4/2017 | Giuli et al. | |
| 9,990,591 B2* | 6/2018 | Gelfenbeyn | G06N 3/006 |
| 10,176,167 B2* | 1/2019 | Evermann | G06F 40/35 |
| 10,216,832 B2* | 2/2019 | Bangalore | G06F 16/3329 |
| 10,268,679 B2* | 4/2019 | Li | G06F 40/35 |
| 10,452,782 B1* | 10/2019 | Kumar | G06F 40/295 |
| 10,497,365 B2* | 12/2019 | Gruber | G10L 15/1815 |
| 10,510,336 B2* | 12/2019 | Amid | G06F 16/35 |
| 10,553,202 B2* | 2/2020 | Amid | G10L 15/1815 |
| 2005/0086592 A1 | 4/2005 | Polanyi et al. | |
| 2006/0080101 A1 | 4/2006 | Chotimongkol et al. | |
| 2006/0129397 A1* | 6/2006 | Li | G10L 15/19 704/245 |
| 2006/0149544 A1 | 7/2006 | Hakkani-Tur et al. | |
| 2007/0055529 A1 | 3/2007 | Kanevsky et al. | |
| 2010/0083348 A1 | 4/2010 | Weber et al. | |
| 2010/0100380 A1 | 4/2010 | Tur | |
| 2010/0179956 A1 | 7/2010 | Jammalamadaka et al. | |
| 2013/0103389 A1* | 4/2013 | Gattani | G06F 40/295 704/9 |
| 2014/0365209 A1* | 12/2014 | Evermann | G06F 40/35 704/9 |
| 2015/0221304 A1* | 8/2015 | Stewart | G06F 40/30 704/235 |
| 2015/0348549 A1* | 12/2015 | Giuli | G10L 15/1822 704/235 |
| 2016/0148610 A1* | 5/2016 | Kennewick, Jr. | G10L 15/18 704/240 |
| 2018/0174578 A1* | 6/2018 | Bangalore | G06F 40/137 |

OTHER PUBLICATIONS

United States Office Action, U.S. Appl. No. 15/384,275, dated Oct. 19, 2017, 12 pages.
United States Office Action, U.S. Appl. No. 15/384,275, dated Jun. 15, 2018, 10 pages.

* cited by examiner

UNDERSPECIFICATION OF INTENTS IN A NATURAL LANGUAGE PROCESSING SYSTEM

CROSS REFERENCE TO RELATED APPLICATIONS

This application is a continuation of U.S. application Ser. No. 15/384,275 filed on Dec. 19, 2016, which is incorporated by reference in its entirety.

FIELD OF ART

The present invention generally relates to the field of natural language processing, and more specifically, to determining user intents from natural language utterances.

BACKGROUND

There are many ways to provide natural language as input to a computer system. However, such systems are not necessarily prepared to respond with ease to utterances that are input in a natural language. If a system were not sufficiently confident about the intent of a user, the system could either query a human intent analyst for clarification or present the user with a long list of possible intents. Human analysts are skilled at quickly determining user intents, but it is costly to employ teams of analysts to provide clarification to computer systems in real time. An alternative—responding to the user with a long list of possible options—can frustrate the user by becoming repetitive and by making it seem as though the system completely failed to understand the user input.

SUMMARY

A natural language processing system interprets natural language inputs (hereinafter "utterances") of users and, in cases where it cannot determine the users' most specific intents, leverages the information that it does understand to determine more general intents and to respond with intelligent prompts and questions related to the general intents to determine more specific intents.

For each domain of interest that a particular company or other organization might have there is an intent ontology (hereinafter "domain hierarchy"). The various domain hierarchies may either be separate, or they may be combined into a single hierarchy that encompasses them all. The intents associated with the leaf nodes of a domain hierarchy represent specific user intents. For example, a specific intent of a user may be to "Book a flight." Ideally, the system recognizes this user intent based on a given utterance. However, for a given utterance, if the system cannot classify the utterance as corresponding to a specific intent with a confidence that exceeds some minimum threshold of confidence, then the system determines confidence scores for non-leaf (also referred to as "ancestor") nodes in the domain hierarchy, which represent more general intents. The nodes that the system evaluates with respect to the utterance are the ancestor nodes of the leaf nodes that represent user intents that the system most confidently associates with the utterance. An ancestor node is selected when the system is sufficiently confident that the ancestor node intent is the same as the intent specified by the utterance.

Although the ancestor node represents a general intent that is less specific than that of the leaf node, the system is still able to gain information about what the user wants. For example, the system may understand that a user has the general intent "Booking," even if it cannot understand that the user specifically wants to book a flight. With the information it was able to gain from the general intent, the system can intelligently prompt the user for more specific information about the user intent, without needing to rely on a top-level menu of generic options or on a human intent analyst to determine the user's meaning.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Environment

Figure 1:
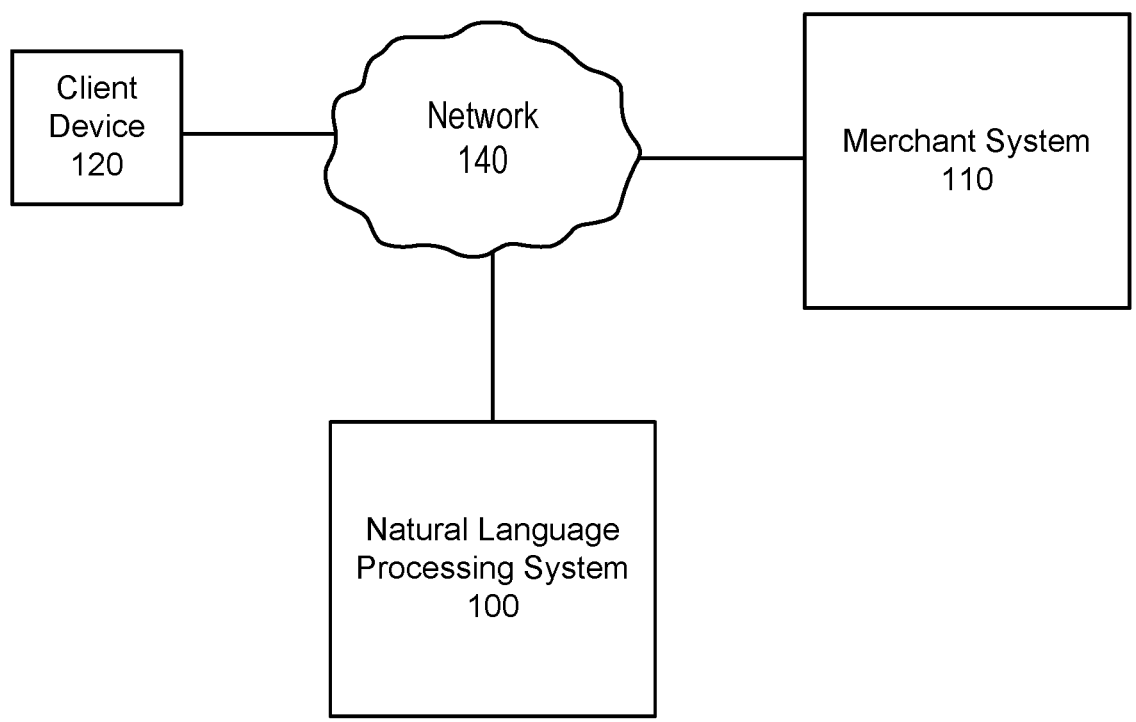
FIG. 1 illustrates a high-level block diagram of a computing environment in which users interact with a computer system using natural language, according to one embodiment.

FIG. 1 illustrates a high-level block diagram of a computing environment in which users interact with a computer system using natural language, according to one embodiment. A client device 120 communicates user utterances over a network 140. A natural language processing system 100, being also connected to the network 140, provides natural language interpretation services on behalf of a merchant system 110. Based on its interpretation of user utterances, the natural language processing system 100 can determine an appropriate response to send to the user and can provide rational feedback to the user via the client device 120. In one embodiment, the natural language processing system 100 provides interpretations of user utterances to the merchant system 110, which can then determine a response to deliver to the client device 120. These various components are now described in additional detail.

Upon receipt of an utterance, the natural language processing system 100 determines an intent represented by that utterance. The natural language processing system 100 will be described in more detail with respect to FIG. 2.

The client device 120 is a computing device such as a smart phone, laptop computer, desktop computer, or any other device that can receive user utterances in a natural language form, such as text or voice input. The client device 120 communicates the utterance over the network 140 to the natural language processing system 100, where the utterance is interpreted.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

System Architecture

Figure 2:
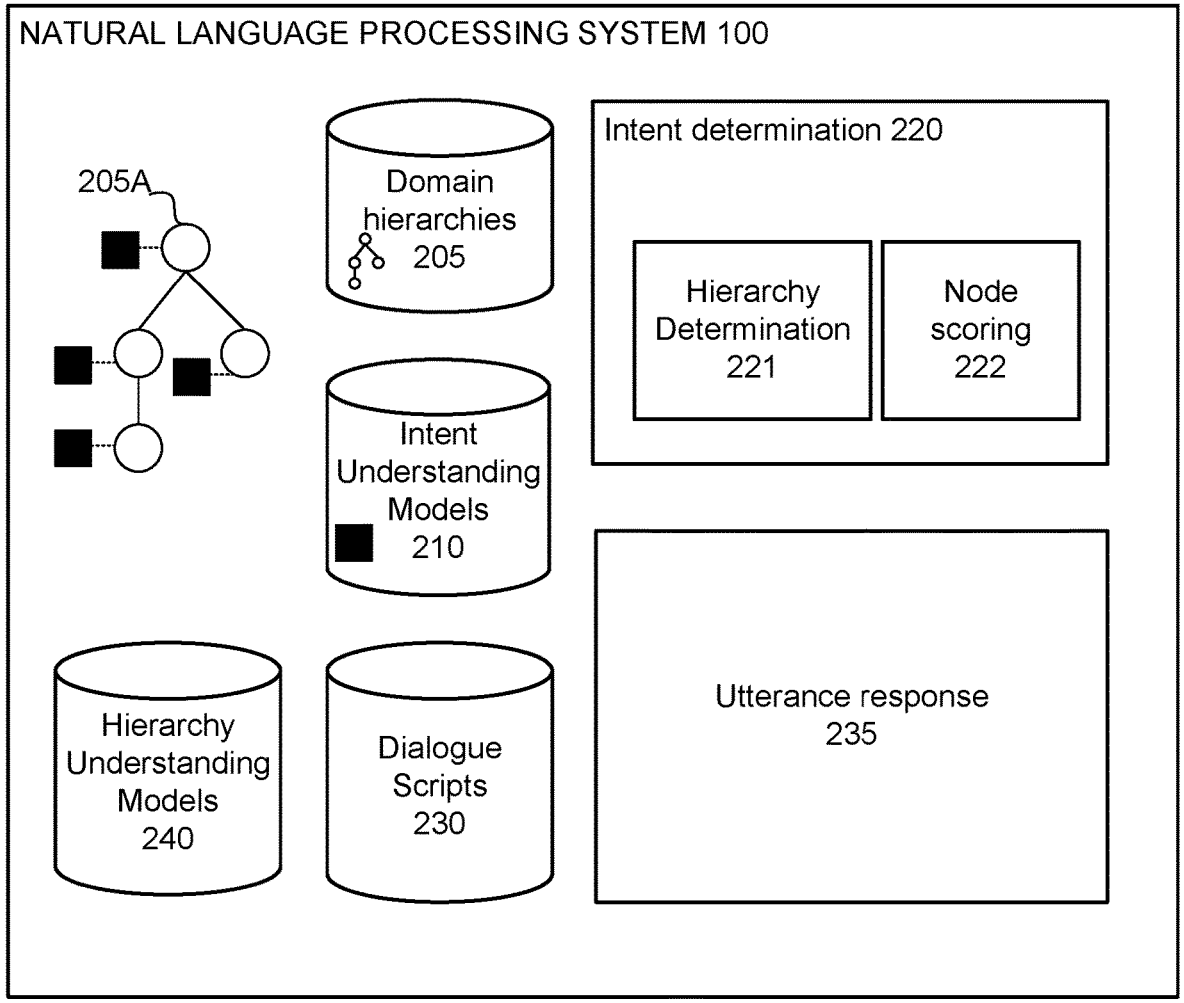
FIG. 2 is a high-level block diagram illustrating a detailed view of the natural language processing system from FIG. 1, according to one embodiment.

FIG. 2 is a high-level block diagram illustrating a detailed view of the natural language processing system 100 from FIG. 1, according to one embodiment. The natural language processing system 100 comprises a repository of domain hierarchies 205, a repository of intent understanding models 210, a repository of hierarchy understanding models 240, a repository of dialogue scripts 230, an utterance response module 235, and an intent determination module 220. In one embodiment, the intent determination module 220 in turn comprises a hierarchy determination module 221, and a node scoring module 222. In one embodiment, the natural language processing system 100 further comprises a repository of task models and a repository of user models (not illustrated in FIG. 2).

The dialogue scripts 230 comprise words, phrases, or other prompts for responding to the user utterances (e.g., to the intents determined for the user utterances). According to one embodiment, a dialogue script can also reference certain task models and user models. For example, a dialogue script can contain a variety of words, phrases and prompts that the utterance response module 235 uses to respond to a user intent. The particular response that the utterance response module 235 uses to respond to a user utterance may depend on the task stored in the repository of task models that is related to the intent and a user model from the repository of user models that may determine which response will be best suited to the particular user. As one example, if the determined user intent for an utterance were to book a flight, the dialogue scripts 230 might contain the response "OK, it sounds like you'd like to book a flight. Please say the city from which you'd like to depart." In some embodiments, the specific content of the response (corresponding to the data to be obtained) is determined by the task models.

The task models comprise information about what processes must take place to complete certain tasks. The task models may further comprise information about what data must be obtained from the user, or from other sources, to accomplish the tasks. For example, a task model for booking a flight could comprise asking for the destination city and traveling days, determining whether any flights are available on the traveling days, and obtaining the passenger's name, seat preference, and credit card number. Based on a task model, the system determines the best way to prompt a user for the information that is relevant to the specific task.

The user models comprise information about the kind of users that are providing user utterances to the client device 120. For example, in some embodiments, the system can recognize a user based on an identifier such as the telephone number of the phone that the user calls from to access the system. In some cases, such as for a returning user, the system may have voice recognition models trained to understand the user's voice. This information is stored as part of a user model that the intent determination module 220 can use to better understand the user's meaning. The user models may also contain user-specific preferences, such as prompts that are chosen for that specific user to enhance relevance or understandability for that user.

Domain hierarchies, stored within the repository of domain hierarchies 205, are hierarchical graphs having leaf nodes and non-leaf nodes (hereinafter referred to as "ancestor nodes" of the leaf nodes, in that they may be parents of leaf nodes, parents of parents, etc.). Each node represents a possible user intent. Each leaf node represents a different specific user intent (the most specific that the domain hierarchy in question recognizes), and the ancestor nodes represent related but more general user intents.

Figure 3A:
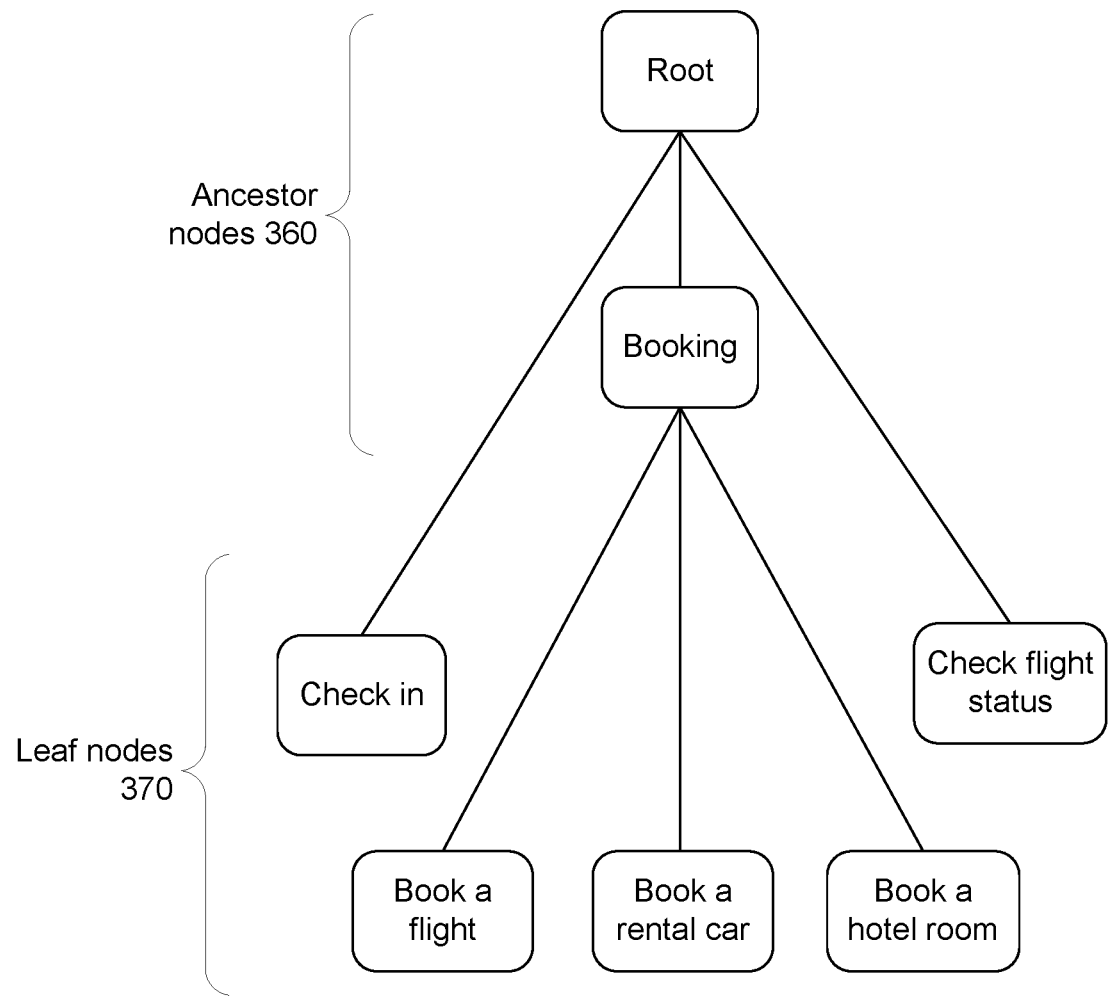
FIG. 3A is a sample domain hierarchy of intents, according to one embodiment.

For example, FIG. 3A is a sample domain hierarchy of intents, according to one embodiment. The example of FIG. 3A is a domain hierarchy constructed to represent airline services. It comprises ancestor nodes 360 that represent general user intents. According to this example domain hierarchy, one ancestor node represents a general user intent of "Booking". The example domain hierarchy of FIG. 3A further comprises leaf nodes 370 that represent specific user intents such as "Check in", "Book a flight", "Book a rental car", "Book a hotel room", and "Check flight status." Some of the leaf nodes 370 are descendants of the ancestor node 360 that represents the general user intent of "Booking" because the specific intents to "Book a flight", "Book a rental car", and "Book a hotel room" are all more specific versions of that general intent. According to the embodiment shown in FIG. 3A, the domain hierarchy also has an ancestor node that is the root node of the domain hierarchy. That is, it is the ancestor node 360 of the domain hierarchy from which all other nodes in the hierarchy are descended. According to one embodiment, the root node represents the most general, i.e. least specific, user intent.

Returning again to FIG. 2, the hierarchy understanding models 240 include a model for each domain hierarchy 205. Hierarchy understanding models 240 map basic information about user utterances to one or more domain hierarchies 205 that are likely to contain information applicable to the user's specific intent. The hierarchy determination module 221 uses the models 240 when determining which of the domain hierarchies 205 is most applicable for a given utterance and hence should be analyzed with respect to the utterance; in some embodiments, each of the hierarchy understanding models 240 is applied to the given utterance, and a most applicable domain hierarchy 205 is selected based on the results (e.g., the domain hierarchy 205 whose corresponding hierarchy understanding model 240 produces the highest score for the utterance). In one embodiment, a hierarchy understanding model 240 is trained using supervised machine learning, in which a training set upon which the hierarchy understanding model is trained contains utterances that are labeled with the general user intents they are known to represent. In one embodiment, the hierarchy understanding model 240 is trained using multinomial logistic regression. Other training techniques may be employed in other embodiments, such as support vector machines, deep neural networks, naïve Bayes, and decision trees.

The intent understanding models 210 comprise an understanding model for each intent node in a domain hierarchy 205. (As a specific example purely for the purposes of illustration, one sample 4-node domain hierarchy 205A is illustrated in FIG. 2, each node depicted with a circle and its corresponding intent understanding model depicted with a square.) An understanding model for a given intent node takes an utterance as input and produces as output a confidence score indicating whether the utterance represents the intent corresponding to the intent node, e.g., as a scalar value representing a probability value, or the like.

In one embodiment, the intent understanding model for each intent node is trained using supervised machine learning, in which a training set upon which the intent understanding model is trained contains utterances that are labeled with the user intents the utterances are known to represent. In one embodiment, the intent understanding models 210 are trained using multinomial logistic regression. Other training techniques such as support vector machines, deep neural networks, aïve Bayes, and decision trees may be employed in other embodiments.

The intent determination module 220 associates a user utterance with an output comprising an intent and a confidence score associated with the intent. For example, if the user utterance were "I would like to book a flight", the output of the intent determination module 220 might be <BookFlight, 0.85>, indicating the "Book Flight" intent with a confidence score of 0.85. In one embodiment, the intent determination module 220 comprises the hierarchy determination module 221, and the node scoring module 222.

For a given utterance, the hierarchy determination module 221 determines which domain hierarchies 205 should be used to determine a user's specific intent. The hierarchy determination module 221 applies hierarchy understanding models 240 to the user utterance. In one embodiment, each hierarchy understanding model outputs a score (e.g., a real number value) indicating a likelihood that the domain hierarchy to which the model corresponds contains information that is applicable to a general intent of the user (and should therefore be used to determine the more specific intent of the user). The hierarchy determination module 221 selects a subset of one or more of the applicable domain hierarchies for the intent determination module 220 to use to determine a specific user intent. For example, the hierarchy determination model might select a domain hierarchy of actions related to purchasing products (e.g., buy, return, refund) and a domain hierarchy of products (e.g., ticket, car, gift card).

For a given subset of domain hierarchies and a given utterance, the node scoring module 222 determines a confidence score for some or all of the intents in the one or more domain hierarchies 205 that were selected by the hierarchy determination module 221. The node scoring module determines confidence scores for leaf nodes by applying the intent understanding models 210 corresponding to nodes in the one or more domain hierarchies.

Once the intent determination module 220 has identified a node whose confidence score exceeds the minimum confidence threshold for a given utterance, the intent determination module 220 outputs an identification of the intent associated with a chosen node and (optionally) the confidence score associated with the chosen node. In embodiments in which multiple domain hierarchies are used to determine an intent, the intent determination module 220 outputs information about nodes that are chosen from each of the domain hierarchies (e.g., in the form of a list of the portions of the overall intent) if each node exceeds the minimum confidence threshold.

The natural language processing system 100 further comprises an utterance response module 235 that uses the intent determined by the intent determination module 220 to respond to the user. Depending on the user intent, the utterance response module 235 accesses a dialogue script from a dialogue script repository 230 which contains information about how to respond to the intent, such as prompts, phrases, or other responses to make to the user. In some embodiments, the utterance response module 235 also accesses task models and user models based on the user intent. In cases where a general, rather than specific, intent was chosen by the intent determination module 220 (i.e. an ancestor node was selected instead of a leaf node), the dialogue scripts 230 can include prompts for clarification about the specific intent of the user. For example, if the intent determination module 220 determines that a user has a general intent of "Booking," then a dialogue script might contain instructions for giving the user the prompt "I see that you are interested in booking. Would you like to book a flight, book a hotel room, or book a rental car?" In this way, the system can provide useful prompts that ask for specific clarifications (e.g., what specific type of thing to book), instead of frustrating a user by asking a the most general question about user intent (e.g., "I didn't get that; please say it again"). In one embodiment, the utterance response module 235 and the dialogue script repository 230 (along with the task models and the user models) are hosted by the merchant system 110 instead of by the language processing system 100.

Under-Specification Algorithms

The scores produced by the node scoring module 222 are used by the intent determination module 220 to determine a most likely specific intent that corresponds to a user utterance. Various ways of determining user intents using confidence scores are now described.

In one embodiment, the node scoring module 222 scores every node in each of the domain hierarchies selected by the hierarchy determination module 221. If the confidence score associated with at least one of these intents exceeds a minimum confidence threshold, then an output is produced by the natural language processing system 100 comprising the intent with the highest confidence score and (in some embodiments) the confidence score associated with the intent.

If the intent determination module 220 determines that none of the determined confidence scores exceeds the minimum confidence threshold, the intent determination module 220 tries to identify an ancestor node(s) that represents an intent that most closely corresponds to the given user utterance. The intent determination module 220 examines the relationship between the two nodes corresponding to the two intents with the two highest confidence scores. If the two nodes have a parent child relationship as expressed in their corresponding intent hierarchy, then the intent determination module outputs the parent node, i.e. the more general node. In a situation in which the nodes of multiple domain hierarchies are scored, this procedure is applied to each hierarchy, and the final output is the concatenation of the results from each hierarchy. For example, there may be two domain hierarchies corresponding to verbs and nouns, respectively. In one particular example, the output of the intent determination module 220 might be <book, flight> with a confidence score of 0.25. If this score is less than the minimum confidence threshold, then the intent determination module 220 may ascertain from the two highest scoring verb intents that <book> should still be output, and conversely determine from the two highest scoring noun intents that <Root> should be output. Consequently, the intent determination module 220 would output <book, Root> as the intent (i.e., the user wants to complete a booking of some kind).

In other embodiments, the confidence scores of only the leaf nodes in a particular hierarchy are computed first. If none of the leaf nodes receive scores of sufficient confidence, then the trained intent understanding models 210 of all or some of the ancestor nodes immediately connected to the leaf nodes are evaluated with respect to the given utterance. This process is repeated, evaluating the next set of nodes up in the hierarchy until either a node is determined to have a score of sufficient confidence, or a root node of the hierarchy is reached, indicating that the utterance does not match any of the possible user intents, even the general intents. It is appreciated that in one embodiment, the intent understanding models 210 of all ancestor nodes between a leaf node and the root node are used to evaluate the utterance before the ancestor nodes of other leaf nodes are evaluated and assigned scores and typically without reevaluating an ancestor node that was scored previously.

According to some embodiments, the confidence score of an ancestor node is determined based on the scores of other nodes, such as the leaf nodes or other ancestor nodes. Examples of algorithms that can be used to score ancestor nodes include: using the geometric mean of the scores of descendant nodes to compute the score for their ancestor node, computing the maximum score of the descendant nodes, or directly identifying the score of the ancestor node without aggregating from the descendant nodes. The particular way in which the scores are determined differs in different embodiments, some of which are subsequently detailed.

In one embodiment, if no leaf nodes receive adequately high confidence scores, then the scores of ancestor nodes are determined using the arithmetic mean of the corresponding leaf nodes. That is, for some or all ancestor nodes that are immediately adjacent to at least one leaf node, the average value of the confidence scores of all leaf nodes that are descendants of the ancestor node in question is determined and assigned as the confidence score of that ancestor node. In some embodiments, the confidence scores of ancestor nodes are determined using the geometric mean, rather than the arithmetic mean, in which case the descendant leaf node scores are multiplied together then the nth root of the result is taken, where n is the number of descendant leaf nodes. The confidence score of the ancestor node is then compared to a new threshold value, lower than the initial threshold value used for the leaf node confidence scores, and tested against that new threshold value to determine whether the confidence score for the ancestor node is high enough for the ancestor node to be chosen as representing the user intent. (As an alternative to choosing a new, lower threshold value, the confidence scores of the ancestor nodes may be increased, e.g., by a multiplier, and compared to the initial threshold value.) If the confidence score of the ancestor node is not sufficiently great, the process is repeated (i.e. scoring the ancestor nodes adjacent to the previously scored nodes), until a node of significantly high confidence is chosen or the root of the hierarchical structure is reached.

Figure 3B:
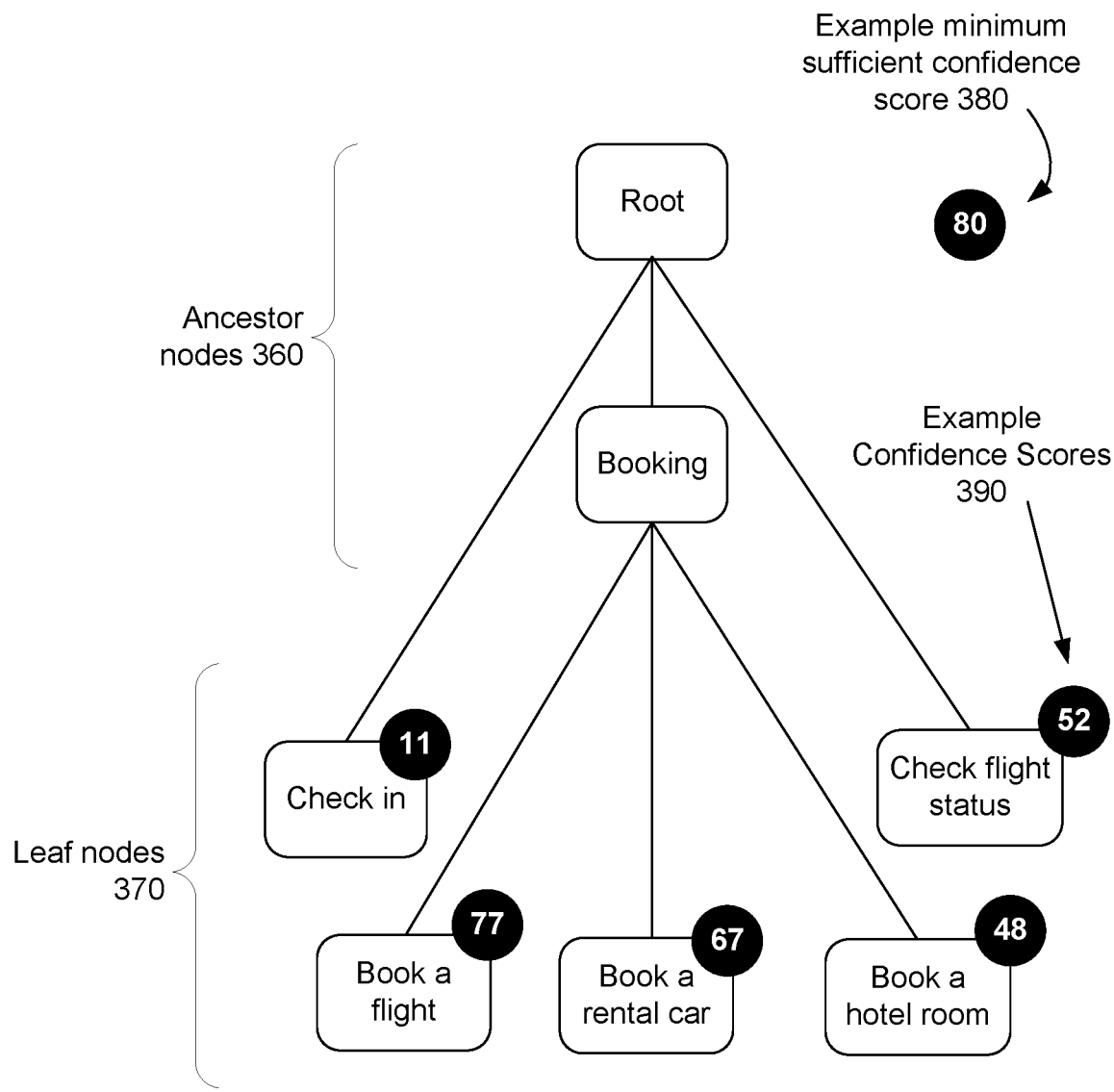
FIG. 3B is the sample domain hierarchy of intents of FIG. 3A with sample confidence scores, according to one embodiment.

For example, FIG. 3B shows one possible embodiment of determining a user intent for a domain hierarchy for an airline, where the confidence scores of ancestor nodes are computed using an arithmetic mean. The leaf nodes 370, which represent specific user intents, have accompanying confidence scores assigned by the node scoring module 222 in response to an utterance. In the example embodiment of FIG. 3B, confidence scores are values between 0 and 100, where a score of 100 for an intent indicates the highest possible confidence that the utterance corresponds to that intent, and a score of 0 indicates the lowest possible confidence that the utterance corresponds to that intent. It is appreciated that confidence scores may be presented in different ways, or with different ranges, in other embodiments. For the purposes of the example, a minimum sufficient confidence score 380 has a value of 80. Since none of the leaf nodes shown in FIG. 3B received confidence scores of at least 80, a confidence score is determined for those ancestor nodes that are immediately adjacent to a leaf node. The "Booking" intent has three descendants that are leaf nodes: "Book a flight" with a score of 77, "Book a rental car" with a score of 67, and "Book a hotel room" with a score of 48. Accordingly, the ancestor node representing the "Booking" intent receives a score of 64, which is the arithmetic mean of the scores of those three leaf node descendants. If, in the example of FIG. 3B, there were an additional ancestor node from which the "Booking", "Check-in", and "Check flight status" nodes descended, that node would receive a confidence score based on the arithmetic mean of all leaf nodes that are descended from it. Namely, its leaf node descendants would include "Check in" with a score of 11, "Book a flight" with a score of 77, "Book a rental car" with a score of 67, "Book a hotel room" with a score of 48, and "Check flight status" with a score of 52, and it would thus receive a score of 51, the average of the confidence scores of the leaf nodes. In this example, assume that the new threshold value were reduced to 80% of the prior threshold (of 70, in this example). Thus, the threshold confidence score value becomes 56. The newly scored nodes are examined, and it is found that "Booking" with a score of 64 exceeds this new confidence score threshold. As a result, "Booking" is chosen as a general intent that corresponds to the utterance.

According to one embodiment, if no leaf nodes receive confidence scores higher than the confidence threshold, a collection of all leaf nodes with scores higher than some predetermined value is found. The nearest common ancestor node to all the nodes in the group of chosen nodes is identified as a general intent of the user. It is appreciated that this technique may also be used by other confidence score determination methods in other embodiments as one possible way to break a tie in the case that two nodes receive identical confidence scores.

For example, the technique of using nearest common ancestor nodes to choose a general intent that corresponds to the utterance is described with respect to the sample domain hierarchy of FIG. 3B. An example minimum confidence score 380 is established with a value of 80. For the sake of the example, a predetermined value of 60 is established as a cutoff value for determining which leaf node confidence scores 390 will be considered when finding a nearest common ancestor. Since none of the example confidence scores 390 that are assigned to the leaf nodes is greater than or equal to 80, the example minimum sufficient confidence 380, the leaf nodes with confidence scores greater than or equal to 60 are found. In this example, these leaf nodes represent the intent "Book a flight" with a score of 77, and the intent "Book a rental car" with a score of 67. The nearest common ancestor node of both the intent to "Book a flight" and the intent to "Book a rental car" is the node that represents the intent "Booking". As a result, "Booking" is chosen as a general intent that corresponds to the utterance.

In one embodiment, if none of the leaf nodes receive sufficiently high confidence scores, some or all ancestor nodes that are adjacent to at least one leaf node receive scores equal to the maximum value of the scores received by some or all leaf nodes that are descendants of the ancestor node in question. In some cases, the minimum value of scores received by some or all leaf nodes that are descendants of the ancestor node may be used to determine the new scores, rather than the maximum value. In some embodiments, the new scores are incremented by some predetermined amount; in other embodiments, the minimum confidence threshold is decreased by some predetermined amount. The newly scored nodes are then compared against the minimum confidence threshold. The process is repeated, propagating up the hierarchy, until a node receives a score that is at least as high as the value of the threshold confidence value, or until the node at the root of the domain hierarchy is reached.

For example, the technique of using maximum values of descendant leaf nodes to determine scores for ancestor nodes is shown with respect to the sample domain hierarchy in FIG. 3B. Since all of the leaf nodes in FIG. 3B received confidence scores 390 with values less than 80, the minimum sufficient confidence score 380, those ancestor nodes adjacent to leaf nodes are scored. The ancestor node that represents the intent "Booking" has three descendant leaf nodes: "Book a flight" with a score of 77, "Book a rental car" with a score of 67, and "Book a hotel room" with a score of 48. The "Booking" ancestor node is assigned a score of 77, the maximum value of the three descendant leaf node scores. The root node is another ancestor node which is adjacent to at least one leaf node. The root node has five descendant leaf nodes. They are "Check in" with a score of 11, "Book a flight" with a score of 77, "Book a rental car" with a score of 67, "Book a hotel room" with a score of 48, and "Check flight status" with a score of 52. The root node receives a confidence score of 77, the maximum of the five descendant leaf node scores. For the sake of this example, the example minimum sufficient confidence value 380 is decreased by a predetermined amount of 20. Thus, the newly scored nodes are compared to a new minimum sufficient confidence score value of 60. Both newly scored nodes have scores of 77, so both have scores that exceed the cutoff value of 60. Thus either the intent "Booking" or the root node are chosen to represent the utterance, according to some predetermined tie-breaking procedure such as determining the nearest common ancestor node of both nodes.

According to one embodiment, two domain hierarchies from the repository of domain hierarchies 205 are used to classify user intents. The user intent is divided into a <verb, noun> pair, with one intent understanding model 210 corresponding to the "verb" part and another intent understanding model 210 corresponding to the "noun" part. The verb refers to a node in a domain hierarchy that contains user intents related to actions. The noun refers to a node in another domain hierarchy that contains user intents related to objects that are to be acted on. For example, in such an embodiment, if the user wants to ask an airline for information about a flight status, the verb could be "check" and the noun could be "flight status". The node scoring module 222 determines a confidence score for a <verb, noun> pair by combining the intent understanding models 210 associated with the verb and the noun, respectively. The node scoring module 222 obtains a confidence score for the <verb, noun> pair by defining a function that takes as input the verb confidence score and the noun confidence score and outputs a new confidence score for the <verb, noun> pair. An example of a function for combining a verb confidence score and a noun confidence score is a minimum function. For example, if a <verb, noun> pair is <book, flight>, the intent understanding model associated with the verb node might assign a confidence score of 0.95 to the verb "book" while the intent understanding model associated with the noun node might assign 0.85 to the noun "flight". Consequently, the minimum function would assign the confidence score 0.85 to the pair <book, flight> because 0.85 is less than 0.95.

Computer System Components

Figure 4:
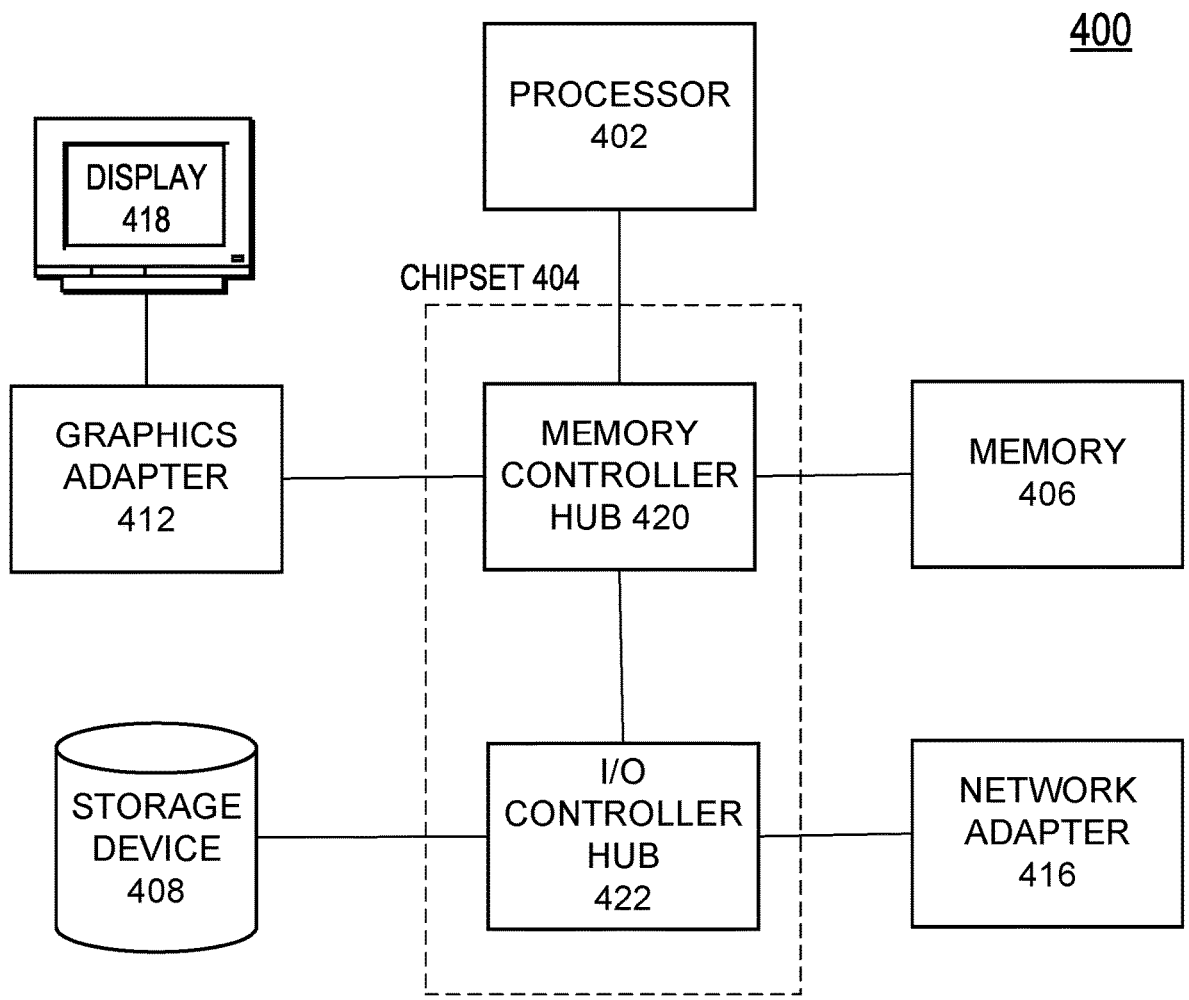
FIG. 4 is a high-level block diagram illustrating physical components of a computer used as part or all of the computing environment from FIG. 1, according to one embodiment.

FIG. 4 is a high-level block diagram illustrating physical components of a computer 400 used as part or all of the computing environment from FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard or pointing device. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A non-transitory computer-readable storage medium comprising instructions executable by a processor for identifying an intent associated with a natural language utterance, the instructions comprising:
   instructions for receiving a natural language utterance of a user;
   instructions for accessing a domain hierarchy of intents comprising leaf nodes and ancestor nodes;
   instructions for accessing a plurality of intent understanding models, wherein each of the intent understanding models of the plurality of intent understanding models is associated with one of the leaf nodes of the domain hierarchy of intents or is associated with one of the ancestor nodes of the domain hierarchy of intents, and wherein each of the plurality of intent understanding models is trained, through supervised machine learning based on a training set of natural language utterances that are labeled with user intents, to determine a confidence score representative of a likelihood that a natural language utterance represents an intent corresponding to the associated ancestor node or the associated leaf node;
   instructions for producing a plurality of node confidence scores by applying the plurality of intent understanding models of the leaf nodes to the natural language utterance;
   instructions for determining that none of the node confidence scores corresponding to the leaf nodes exceeds a given minimum confidence threshold;
   instructions for producing confidence scores for one or more ancestor nodes;
   instructions for identifying a most applicable ancestor node based on the one or more produced confidence scores of ancestor nodes; and
   instructions for identifying, as a general intent of the natural language utterance, an intent corresponding to the identified most applicable ancestor node.

2. The non-transitory computer-readable storage medium of claim 1, the instructions further comprising:
   instructions for identifying, based on the identified general intent, a prompt for additional information; and
   instructions for providing the prompt to the user over the computer network.

3. The non-transitory computer-readable storage medium of claim 1, wherein any descendant node in the hierarchy of intents corresponds to a more specific user intent than the intents corresponding to any ancestor nodes from which the descendant node is descended.

4. The non-transitory computer-readable storage medium of claim 1, wherein applying the intent understanding models comprises associating the natural language utterance with a verb from a domain hierarchy of actions and with a noun from a domain hierarchy of intents related to items.

5. The non-transitory computer-readable storage medium of claim 1, wherein applying the intent understanding models comprises associating the natural language utterance with two or more intents, each intent selected from its own intent hierarchy.

6. The non-transitory computer-readable storage medium of claim 1, wherein the ancestor node confidence score is determined by calculating a function of the confidence scores of other nodes in the same intent hierarchy.

7. The non-transitory computer-readable storage medium of claim 6, wherein the ancestor node confidence score is determined by calculating a geometric mean of the leaf node confidence scores of leaf nodes descended from the ancestor node.

8. The non-transitory computer-readable storage medium of claim 6, wherein the ancestor node confidence score is determined by determining a maximum confidence score of leaf nodes descended from the ancestor node.

9. The non-transitory computer-readable storage medium of claim 6, the instructions further comprising:
- instructions for applying, to the utterance, a plurality of hierarchy understanding models for a corresponding plurality of domain hierarchies to produce a corresponding plurality of scores for the utterance;
- instructions for selecting a subset of the domain hierarchies based on the scores; and
- instructions for identifying the most applicable ancestor node based on the selected subset.

10. A computer-implemented method for identifying an intent associated with a natural language utterance comprising:
- receiving a natural language utterance of a user over a computer network;
- accessing a domain hierarchy of intents comprising leaf nodes and ancestor nodes;
- accessing a plurality of intent understanding models, wherein each of the intent understanding models of the plurality of intent understanding models is associated with one of the leaf nodes of the domain hierarchy of intents or is associated with one of the ancestor nodes of the domain hierarchy of intents, and wherein each of the plurality of intent understanding models is trained, through supervised machine learning based on a training set of natural language utterances that are labeled with user intents, to determine a confidence score representative of a likelihood that a natural language utterance represents an intent corresponding to the associated ancestor node or the associated leaf node;
- producing a plurality of node confidence scores by applying the plurality of intent understanding models of the nodes to the natural language utterance;
- determining that none of the node confidence scores corresponding to the leaf nodes exceeds a given minimum confidence threshold;
- producing confidence scores for one or more ancestor nodes;
- identifying a most applicable ancestor node based on the one or more produced confidence scores of ancestor nodes; and
- identifying, as a general intent of the natural language utterance, an intent corresponding to the identified most applicable ancestor node.

11. The computer-implemented method of claim 10, further comprising:
- identifying, based on the identified general intent, a prompt for additional information; and
- providing the prompt to the user over the computer network.

12. The computer-implemented method of claim 10, wherein any descendant node in the hierarchy of intents corresponds to a more specific user intent than the intents corresponding to any ancestor nodes from which the descendant node is descended.

13. The computer-implemented method of claim 10, wherein applying the intent understanding models comprises associating the natural language utterance with a verb from a domain hierarchy of actions and with a noun from a domain hierarchy of intents related to items.

14. The computer-implemented method of claim 10, wherein applying the intent understanding models comprises associating the natural language utterance with two or more intents, each intent selected from its own intent hierarchy.

15. The computer-implemented method of claim 10, wherein the ancestor node confidence score is determined by calculating a function of the confidence scores of other nodes in the same intent hierarchy.

16. The computer-implemented method of claim 15, wherein the ancestor node confidence score is determined by calculating a geometric mean of the leaf node confidence scores of leaf nodes descended from the ancestor node.

17. The computer-implemented method of claim 15, wherein the ancestor node confidence score is determined by determining a maximum confidence score of leaf nodes descended from the ancestor node.

18. The computer-implemented method of claim 15, further comprising:
- applying, to the utterance, a plurality of hierarchy understanding models for a corresponding plurality of domain hierarchies to produce a corresponding plurality of scores for the utterance;
- selecting a subset of the domain hierarchies based on the scores; and
- identifying the most applicable ancestor node based on the selected subset.

* * * * *